United States Patent
Hedlund

(10) Patent No.: US 11,516,990 B2
(45) Date of Patent: Dec. 6, 2022

(54) MILKER UNIT SHORT MILK TUBE WITH MILK CLAW END CONNECTOR

(71) Applicant: GEA Farm Technologies, Inc., Naperville, IL (US)

(72) Inventor: Nathan Hedlund, Galesville, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 392 days.

(21) Appl. No.: 16/544,458

(22) Filed: Aug. 19, 2019

(65) Prior Publication Data

US 2021/0051913 A1  Feb. 25, 2021

(51) Int. Cl.
 *A01J 5/04* (2006.01)

(52) U.S. Cl.
 CPC ..................................... *A01J 5/044* (2013.01)

(58) Field of Classification Search
 CPC .... A01J 5/041; A01J 5/044; A01J 5/04; A01J 5/10
 USPC ......... 119/14.37, 14.46, 14.54, 14.55, 14.47, 119/14.51, 14.52
 See application file for complete search history.

(56) References Cited

U.S. PATENT DOCUMENTS

| | | |
|---|---|---|
| 1,301,992 A | 4/1919 | Anderson |
| 2,099,884 A | 11/1937 | Green |
| 2,341,953 A | 2/1944 | Scott |
| 2,513,627 A | 7/1950 | Dinesen |
| 3,079,891 A | 3/1963 | Miller |
| 3,713,423 A * | 1/1973 | Sparr, Sr. ................. A01J 7/04 119/670 |
| 3,967,587 A * | 7/1976 | Noorlander ............... A01J 5/08 119/14.49 |
| 3,999,516 A * | 12/1976 | Shulick ................... A01J 5/041 119/14.1 |
| 4,043,739 A * | 8/1977 | Appel ................... B29C 48/313 425/461 |
| 4,090,471 A * | 5/1978 | Thompson ............ A01J 5/0075 119/14.51 |
| 4,196,696 A * | 4/1980 | Olander ................... A01J 5/04 119/14.51 |
| 4,324,201 A * | 4/1982 | Larson ................... A01J 5/041 119/14.51 |

(Continued)

FOREIGN PATENT DOCUMENTS

| | | |
|---|---|---|
| DE | 1011212 B | 6/1957 |
| WO | 99/66787 | 12/1999 |

(Continued)

OTHER PUBLICATIONS

International Search Report for International Application No. PCT/US2020/046668, dated Nov. 25, 2020, 16 pages.

(Continued)

*Primary Examiner* — Tien Q Dinh
*Assistant Examiner* — Kevin M Dennis
(74) *Attorney, Agent, or Firm* — BainwoodHuang

(57) ABSTRACT

A milker unit short milk tube having a downstream milk claw connection end; a position and release device joined to and extending away from the downstream milk claw connection end; a controlled flexible portion disposed in an upstream direction from the position and release device; a reinforced portion disposed in upstream direction from the controlled flexible portion; and an interior milking claw inlet sealing surface.

38 Claims, 8 Drawing Sheets

(56) References Cited

U.S. PATENT DOCUMENTS

| | | | | |
|---|---|---|---|---|
| 4,441,454 A | * | 4/1984 | Happel | A01J 5/041 119/14.36 |
| 4,530,307 A | * | 7/1985 | Thompson | A01J 5/08 119/14.49 |
| 4,745,881 A | * | 5/1988 | Larson | A01J 5/08 119/14.51 |
| 4,869,205 A | * | 9/1989 | Larson | A01J 5/044 119/14.51 |
| 4,924,809 A | * | 5/1990 | Verbrugge | A01J 5/08 119/14.02 |
| 5,007,378 A | * | 4/1991 | Larson | A01J 5/08 119/14.47 |
| 5,161,482 A | * | 11/1992 | Griffin | A01J 5/041 119/14.02 |
| 5,482,004 A | | 1/1996 | Chowdhury | |
| 5,493,995 A | | 2/1996 | Chowdhury | |
| 5,572,947 A | | 11/1996 | Larson et al. | |
| 5,752,462 A | | 5/1998 | Petersson | |
| 6,142,098 A | | 11/2000 | van den Berg | |
| 6,164,243 A | | 12/2000 | Larson | |
| 6,302,058 B1 | | 10/2001 | Dahl et al. | |
| 6,427,624 B1 | | 8/2002 | Briggs et al. | |
| 6,742,475 B1 | | 6/2004 | McLeod et al. | |
| 6,755,153 B1 | | 6/2004 | Chowdhury | |
| 6,776,120 B1 | | 8/2004 | Chowdhury | |
| 6,895,890 B1 | | 5/2005 | Maier, Jr. | |
| 6,895,892 B2 | | 5/2005 | Sellner et al. | |
| 7,290,498 B2 | | 11/2007 | Shin | |
| 7,293,527 B2 | | 11/2007 | Shin | |
| 7,578,260 B2 | | 8/2009 | Shin | |
| D624,715 S | * | 9/2010 | Auburger | D30/199 |
| 8,113,145 B2 | | 2/2012 | Sellner | |
| 8,567,346 B1 | | 10/2013 | Älveby | |
| 8,813,681 B2 | | 8/2014 | Chowdhury | |
| 9,288,962 B2 | | 3/2016 | Priest | |
| 9,408,367 B2 | | 8/2016 | Alveby | |
| 9,439,391 B2 | | 9/2016 | Kochman | |
| 9,504,226 B2 | | 11/2016 | Buck et al. | |
| 9,510,555 B2 | | 12/2016 | Chowdhury | |
| 9,545,079 B2 | | 1/2017 | Torgerson et al. | |
| 9,770,006 B2 | | 9/2017 | Torgerson et al. | |
| 9,801,351 B2 | | 10/2017 | Auburger et al. | |
| 9,883,652 B2 | | 2/2018 | Torgerson et al. | |
| 9,930,863 B2 | | 4/2018 | Torgerson et al. | |
| 10,499,610 B2 | | 12/2019 | Torgerson et al. | |
| 10,785,952 B2 | | 9/2020 | Hedlund | |
| 2004/0025794 A1 | * | 2/2004 | Maier | A01J 5/044 119/14.51 |
| 2006/0005772 A1 | | 1/2006 | Shin | |
| 2006/0016399 A1 | | 1/2006 | Torgerson | |
| 2008/0035064 A1 | | 2/2008 | Petterson et al. | |
| 2008/0072825 A1 | | 3/2008 | Petersson | |
| 2008/0276871 A1 | | 11/2008 | Auburger et al. | |
| 2014/0123903 A1 | | 5/2014 | Priest | |
| 2014/0190416 A1 | | 7/2014 | Kochman et al. | |
| 2015/0114298 A1 | | 4/2015 | Alveby | |
| 2016/0007559 A1 | | 1/2016 | Andersson et al. | |
| 2018/0228117 A1 | | 8/2018 | Gruter et al. | |

FOREIGN PATENT DOCUMENTS

| | | | | |
|---|---|---|---|---|
| WO | | 02/07506 A1 | 1/2002 | |
| WO | | 2004110134 A2 | 12/2004 | |
| WO | | 2005018308 A1 | 3/2005 | |
| WO | | 2006/004761 A1 | 1/2006 | |
| WO | | 2009147369 A1 | 12/2009 | |
| WO | | WO-2009147369 A1 * | 12/2009 | A01J 5/044 |

OTHER PUBLICATIONS

International Search Report for International Application No. PCT/US03/31002, dated Apr. 2, 2004, 4 pages.

ASAE, Terminology for Milking Machines, Milk Cooling, and Bulk Milk Handling Equipment, S300.3, Jul. 1996, 9 pages.

International Search Report for International Application No. PCT/US2008/010095, dated Oct. 27, 2008, 7 pages.

International Preliminary Report on Patentability for International Application No. PCT/US2008/010095, dated Mar. 30, 2010, 5 pages.

* cited by examiner

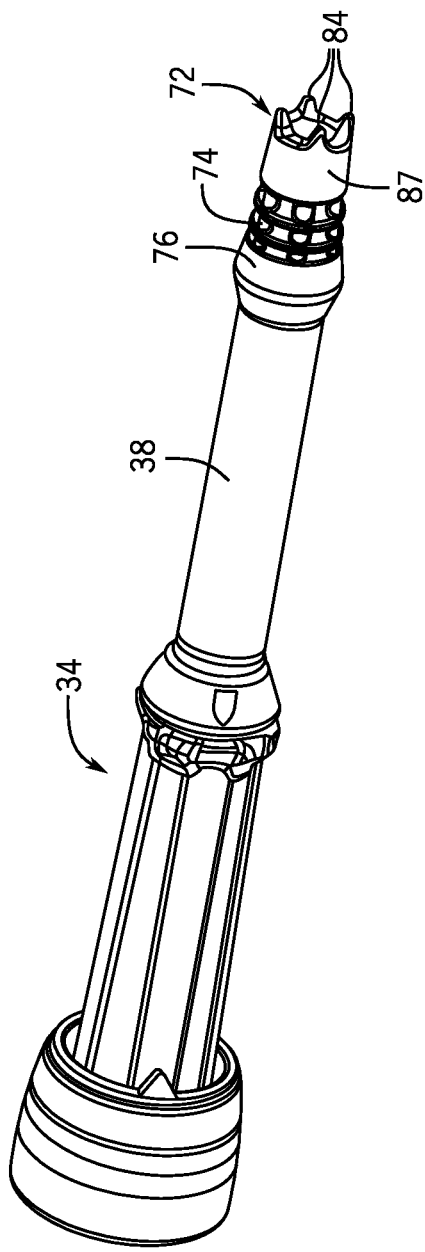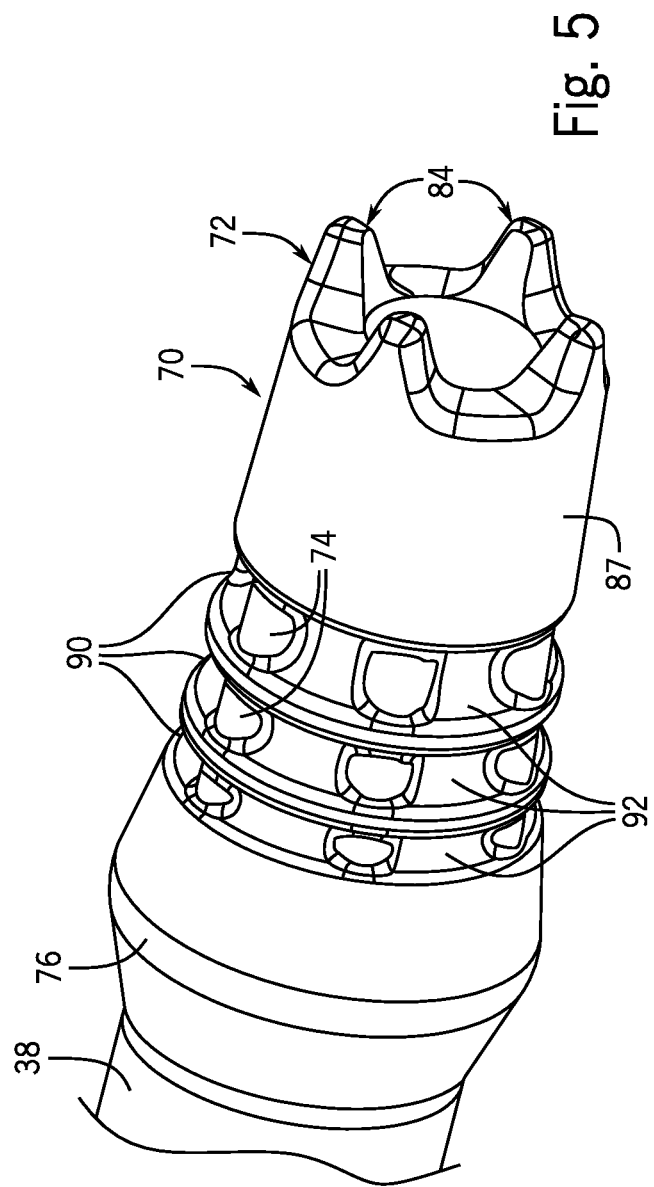

MILKER UNIT SHORT MILK TUBE WITH MILK CLAW END CONNECTOR

FIELD AND BACKGROUND OF THE INVENTION

The present invention relates generally to dairy milker unit short milk tubes, and more particularly to short milk tubes extending between an upstream milking teat cup liner and a downstream milk collection bowl and claw arrangement, and the connection to the claw inlet.

In milk harvesting facilities, dairy animals are arranged in stalls and milker units are attached to the animals' teats to harvest milk. The milker units include a teat cup for each teat, a teat cup liner disposed inside each teat cup, a short milk tube joined to or formed integrally with each teat cup liner, and a milking claw and bowl assembly for collecting milk from all of the short milk tubes in the milker unit for passage to a central dairy milk pipeline.

The dairy environment is harsh and milker units are subject to constant use, abuse from handling by dairy operators, and impacts from animals. Consequently, dairy milker unit components must be robust and securely connected to one another to provide reliable service. Short milk tubes, in particular, must bend between a milking position and a standby position during which the short milk tube must also carry the weight of the teat cup and liner.

When being attached to an animal or shortly after milking, the teat cup and liner hang down and the short milk tube is bent or kinked to cut off a constant vacuum being applied in the milker unit from reaching the open-ended teat cup liner and undesirably drawing air into the central dairy milk line. Typically, the bending of the short milk tube occurs at the end of an inlet to the milking claw. Some prior short milk tubes incorporated radial grooves in the teat cup liner milk tube to optimize flexibility and achieve better air-flow reduction during the attachment process, but the radial grooves can result in reduced durability in that area of the milk tube.

Also, the milk claw inlet is made of stainless steel and is tapered to a relatively aggressive edge that engages the bent portion of the short milk tube. With the weight of the teat cup and the teat cup liner hanging on the short milk tube, the milking claw inlet can cause excessive short milk tube wear.

The connection between the short milk tube and the milk claw inlet is typically a friction fit with the short milk tube pushed onto an outer surface of the inlet. The short milk tube also develops a strong adherence to the milk claw inlet during use, so operators typically install the short milk tubes only part way onto the inlet of the milking claw to make it easier to remove the short milk tubes when they need to be changed.

Thus, there is a need for a durable short milk tube that is easy to attach to the milk claw nipple and limits air flow into the central dairy milk lines while the teat cup is not in use and is being attached to the dairy animal.

SUMMARY OF THE INVENTION

The present invention provides a short milk tube having a reliable seal over a milk claw inlet when a milker unit is not being used and when its corresponding teat cup and liner are being attached to an animal teat. A milker unit short milk tube in accordance with the present invention includes: an outer wall surface; an inner wall surface defining a milk passage having an upstream direction and a downstream direction; a downstream milk claw connection end; and a position and release device joined to and extending away from the downstream milk claw connection end to ensure that the short milk tube components are located with precision or to aid in removal. The short milk tube may be separate from a teat cup liner or formed integrally with the liner.

The short milk tube may also include a flexible portion for reliable bending to seal the short milk tube, and a reinforced portion to improve durability. Controlled and reliable short milk tube flexing can be provided by a grooved portion on the short milk tube positioned to conform to a beveled portion of a milking claw inlet, thereby maximizing air flow reduction when not in use and also during the process of attaching the milker unit to the cow. The grooved portion is prone to excessive liner wear, so a reinforced portion slightly upstream from the grooved portion is also provided to engage an end portion of the milk claw inlet. These critical features require relatively precise positioning of the short milk tube attachment to the milk claw inlet to function properly, so the position and release device is used for installing the milk tube consistently and accurately.

A reliable position and release device on the end of the short milk tube in accordance with the present invention ensures that the flexing and reinforced portions are located accurately relative to the end of the milking claw inlet. Incompletely positioning the short milk tube on the pointed end of the milk claw inlet could cause the flexing portion not to align properly and result in a failure to properly seal the liner from vacuum or cause the flexible portion to engage the aggressive end portion of the milk claw inlet.

Further, easier removal of the short milk tube from the milking claw inlet is achieved by first pushing the milk tube further onto the inlet to compress the position and release device, and then pulling the short milk tube from the inlet. The initial pushing to compress the position and release device significantly reduces friction when the short milk tube is put under tension for removal. The position and release device preferably includes protruding positioning prongs to touch the milking claw top surface and act as spacers to guide installation to the optimum position on the milking claw nipple during installation. When it is necessary to remove the short milk tube, the positioning prongs are compressed to break at least some of the adherence of the short milk tube to the milker unit inlet to make it easier to pull off the short milk tube.

The reinforced portion of the short milk tube can be disposed on the outer wall surface opposite the interior milking claw inlet sealing surface, and be a portion of increased wall thickness or a different and more durable material than the rest of the short milk tube. The controlled flexible portion is preferably an area of reduced wall thickness and can include a plurality of annular grooves, and a plurality of ribs disposed in the grooves. The short milk tube can be integral with or separate from the teat cup liner. The claw inlet sealing surface can be part of the tube inner wall surface or be a separate device or material mounted inside the tube.

Further details and advantages of the present invention are described below.

BRIEF DESCRIPTION OF THE DRAWINGS

FIG. 4 is a perspective view of a milker unit teat cup liner with a short milk tube, in accordance with the present invention;

FIG. 5 is a partial perspective view of the teat cup liner short milk tube of FIG. 4;

DETAILED DESCRIPTION OF THE INVENTION

Figure 1:
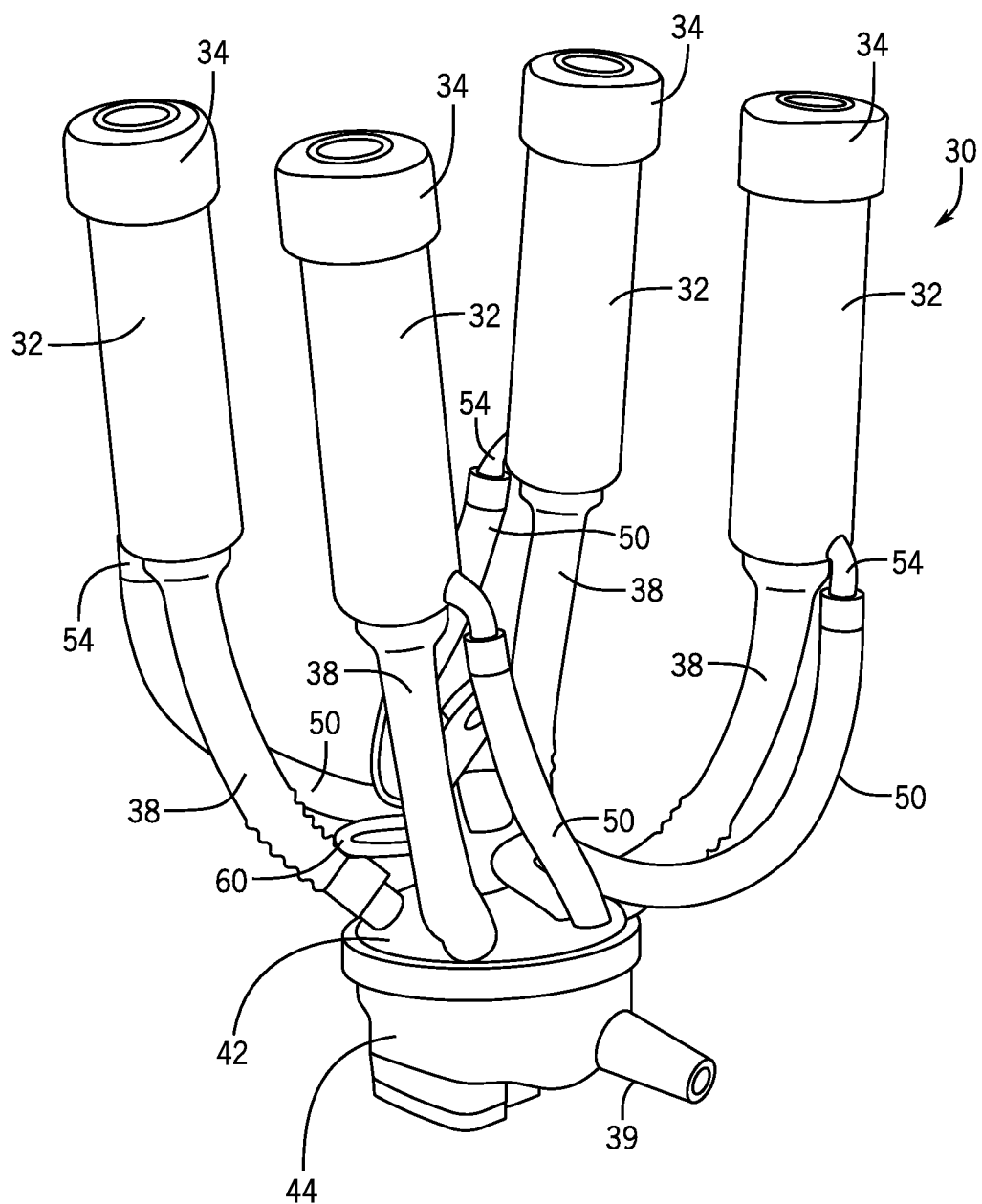
FIG. 1 is a perspective view of a milker unit.

Illustrated generally in FIG. 1 is a traditional milker unit 30 having a teat cup 32, a teat cup liner 34 disposed in the teat cup 32, a short milk tube 38 joined to or formed integrally with the teat cup liner 34, a milking claw 42, and milk bowl 44 at its downstream end. There is one teat cup 32, liner 34, and short milk tube 38 for each teat of the dairy animal. The milking claw 42 and milk bowl 44 collect milk from all short milk tubes 38. (The milker unit illustrated in FIG. 1 is depicted for background and does not illustrate the short milk tube invention described below.) The objective of the milker unit 30 is to draw milk away from the dairy animal teats, out of a milk bowl outlet 39, and into the central dairy milk lines (not illustrated), reduce the amount of milk flowing back toward the teat, and reduce the amount of air drawn into the central dairy milk line when vacuum is being applied.

During milking, a dairy animal teat is inserted through an upper orifice of the teat cup liner 34. Just before and during milking, a constant vacuum is applied inside the milker unit 30 to attach the liner 34 and teat cup 32 to the teat and then draw milk through the liner 34, the short milk tube 38, the milking claw 42 and the bowl 44, and out of the milk bowl outlet 39. The weight of the milker unit 30 is supported by the teats because of the constant vacuum being applied inside the milker unit 30.

The teat cup 32 (sometimes referred to in the art as a "shell") is a relatively rigid cup typically made of stainless steel or other suitable material. The teat cup liner 34 is disposed inside the teat cup 32, and a pulsation chamber is defined in the space between the teat cup 32 and the liner 34. A pulsating vacuum is applied through a short pulse tube 50 that extends between a short pulse nipple 54 and a short pulsation connection 56 on the milking claw 42. A long pulsation hose (not illustrated) connects to a long pulsation hose nipple 58 on the milking claw 42. The pulsation acting on the pulsation chamber moves the liner 34 in and out of contact with the animal teat to milk the animal. A hanger 60 is also provided on the milking claw 42 to support the milker unit 30 from a milker unit detacher mechanism (not illustrated) when not milking.

The short milk tube 38 of the present invention includes a wall 62 having an outer wall surface 64 and an inner wall surface 66 defining a milk passage 68. The milk passage 68 has as an upstream direction toward the liner 34 and a downstream direction toward the milking claw 42. The short milk tube further includes; a downstream milk claw connection end 70 and a position and release device 72 joined to and extending away from the downstream milk claw connection end 70. Preferably, the short milk tube 38 also includes a controlled flexible portion 74 disposed in the upstream direction from the position and release device 72, a reinforced portion 76 disposed in the upstream direction from the controlled flexible portion 74, and an interior milking claw inlet sealing surface 78 disposed on the inner wall surface 66.

Figure 2:
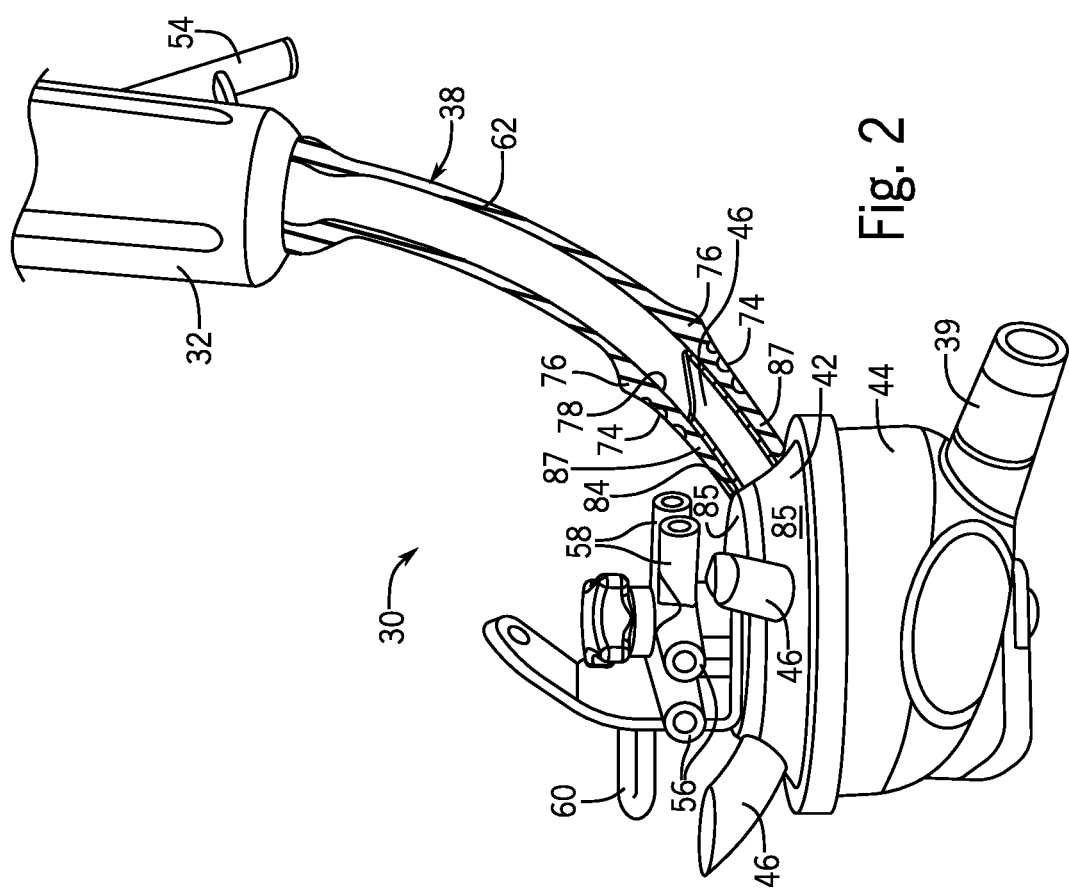
FIG. 2 is a partial perspective view of a milk unit with a short milk tube in a milking position, in accordance with the present invention.
Figure 3:
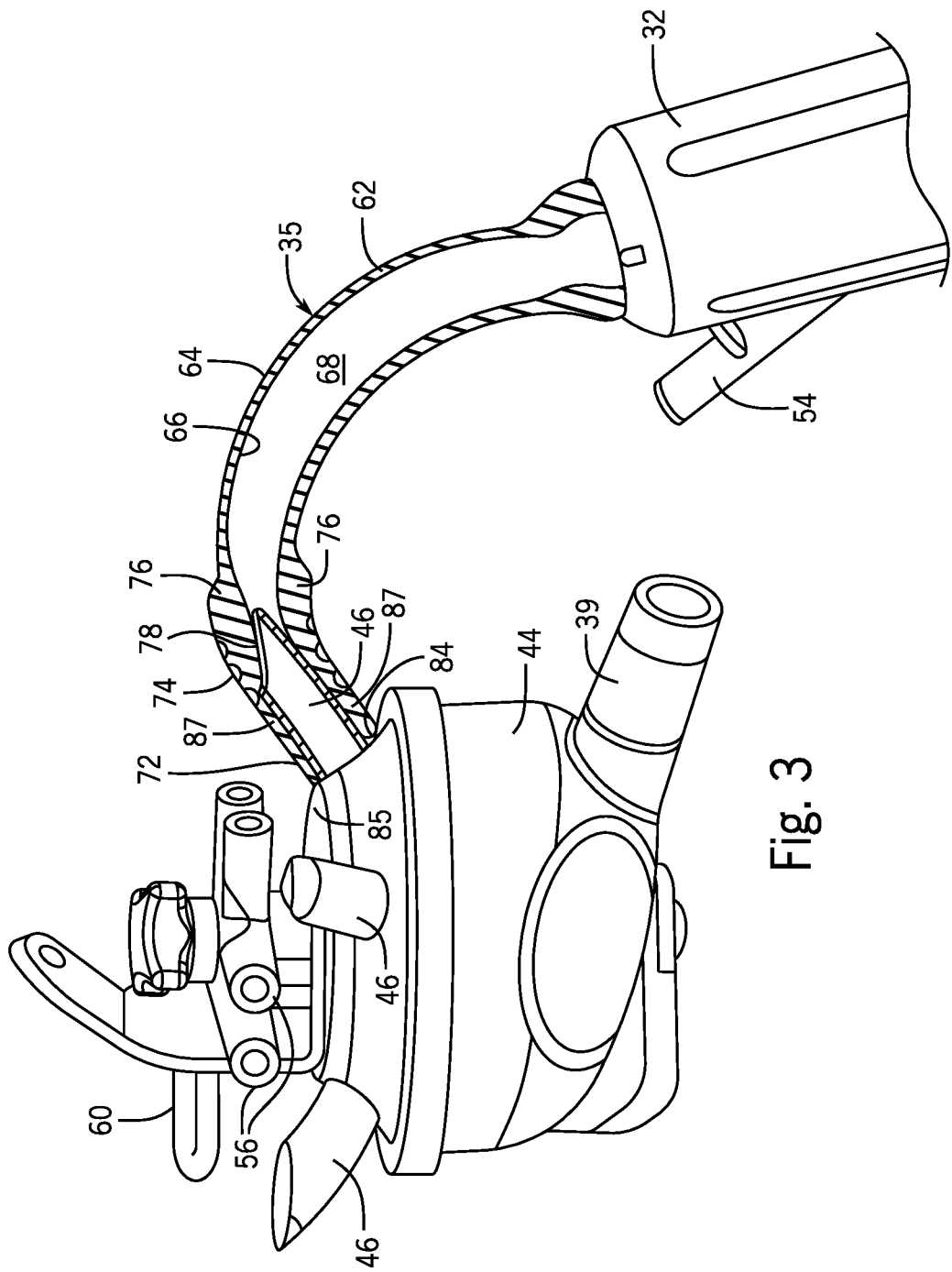
FIG. 3 is a partial perspective and cross-sectional view of the milker unit with the short milk tube of FIG. 1 in a standby position.
Figure 6:
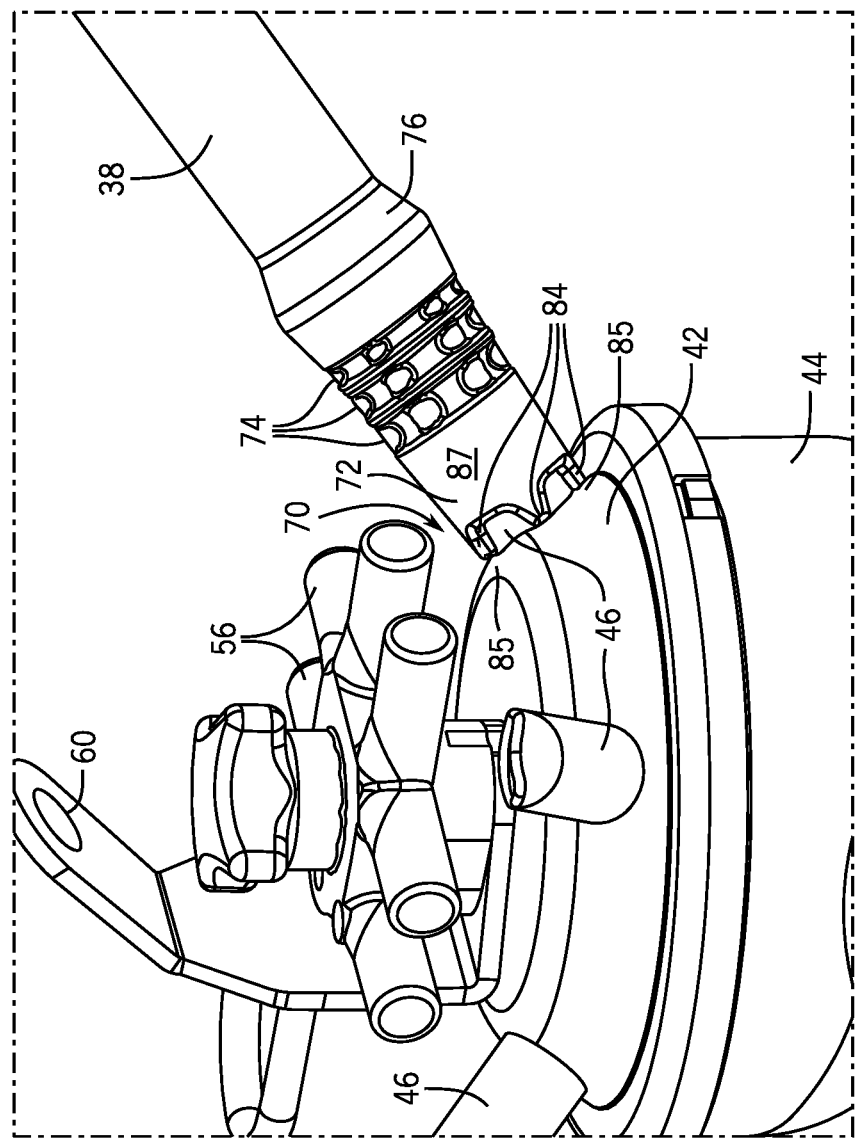
FIG. 6 is a partial perspective view of the short milk tube connected to a milk unit claw, in accordance with the present invention.
Figure 7:
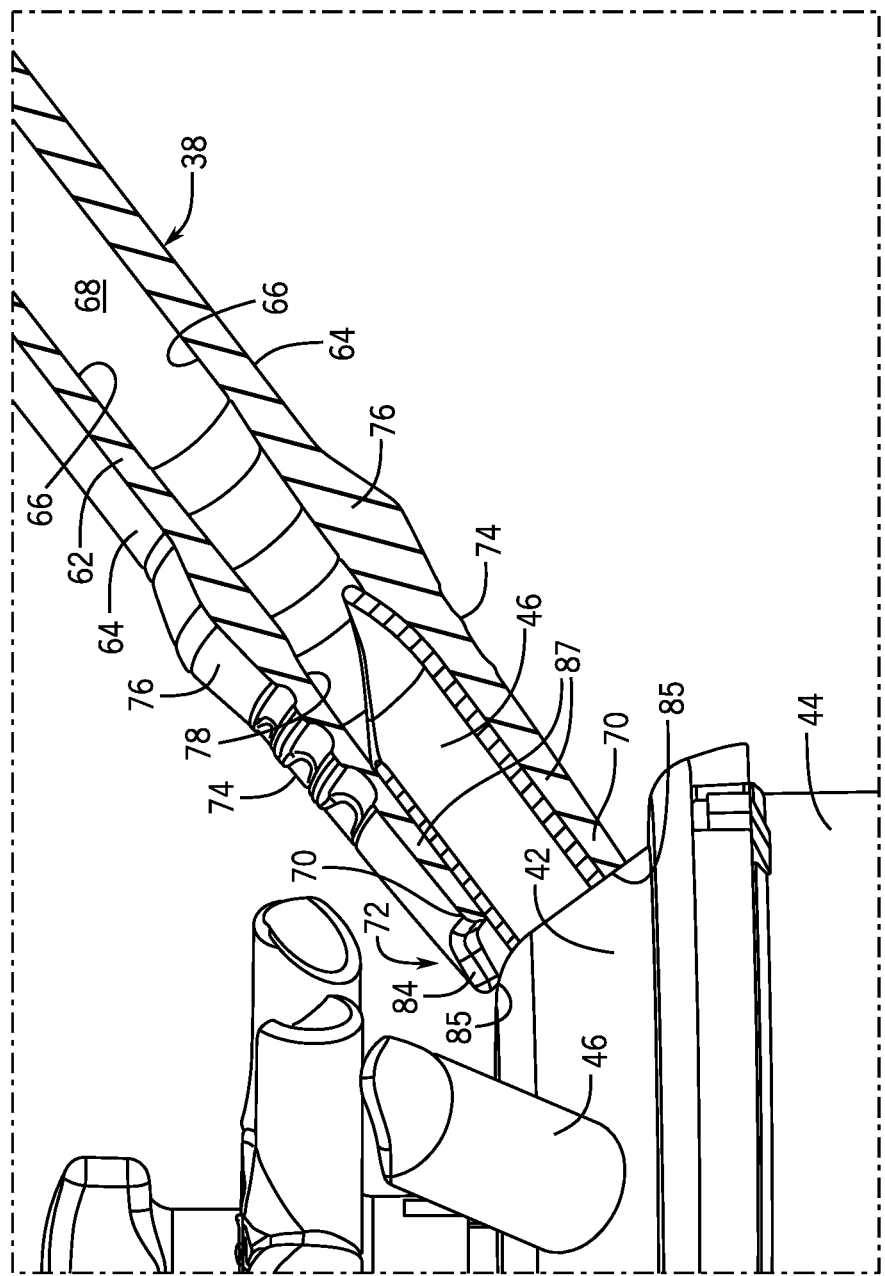
FIG. 7 is a partial perspective and cross-sectional view of the short milk tube and milk claw of FIG. 6.
Figure 8:
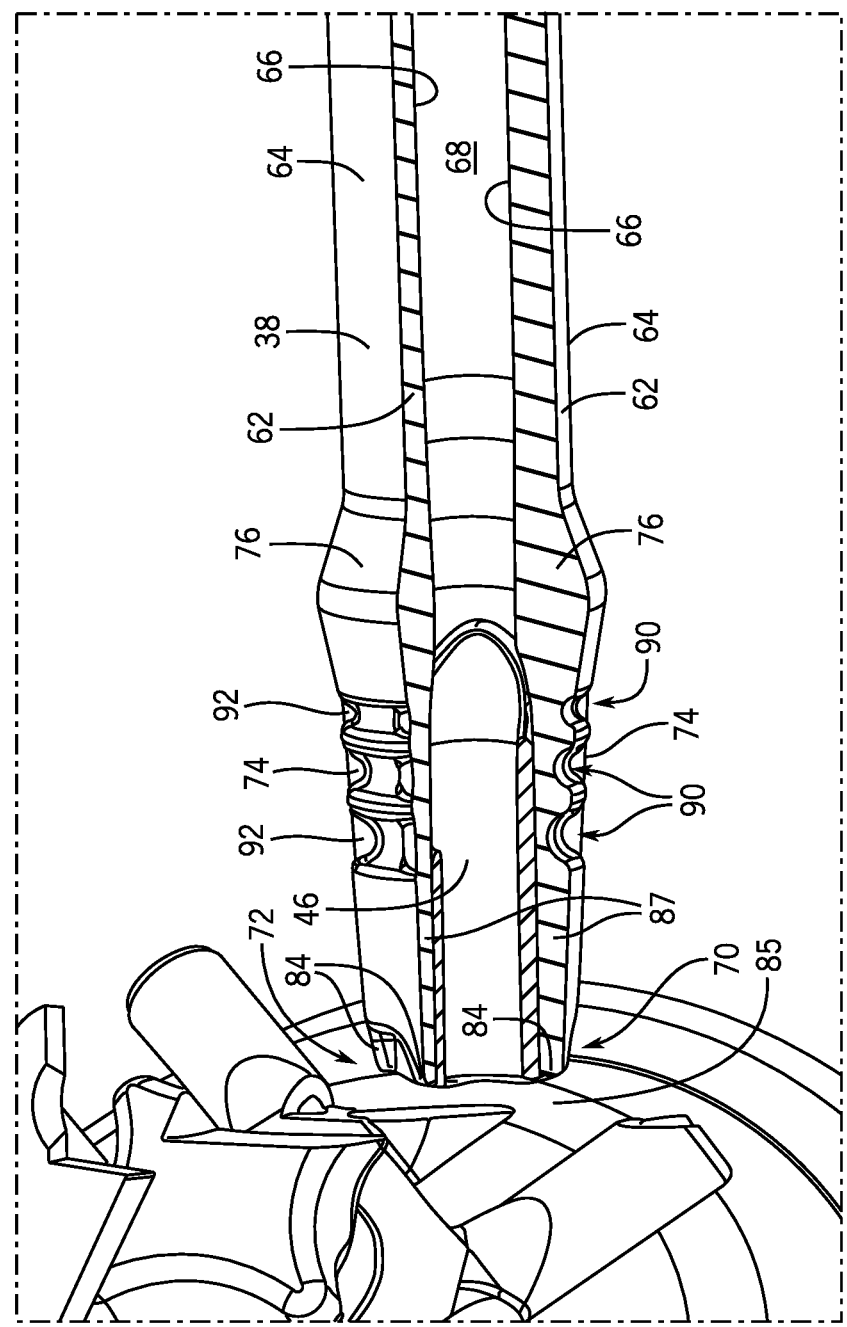
FIG. 8 is a top and partial cross-sectional view of the short milk tube and milker unit claw taken along line 8-8 in FIG. 7.

When the milker unit 30 is attached to an animal in a "milking position" (FIG. 2), the milker unit 30 is essentially a closed system and there is relatively little stress on the short milk tube. When the milker unit 30 is released from an animal, the teat cup 32 and the liner 34 drop downward and the short milk tube 38 bends over into a "standby position" (FIG. 3). The bending of the short milk tube 38 essentially kinks the short milk tube 38 against the milking claw inlet 46 to prevent air from entering the now open end of the teat cup liner 34. The milking claw inlet 46 is made of stainless steel and is tapered, so a relatively aggressive edge engages the inner wall surface of the bent portion of the short milk tube 38. The short milk tube 38 of the present invention resists wear by including the reinforced portion 76 adjacent to and upstream from the milking claw inlet 46 so that it engages the inlet 46 when the short milk tube 38 is properly positioned.

Further, when the constant vacuum is resumed just prior to milking and before the teat cup 32 and liner 34 are attached to the animal, the kink in the short milk tube 38 permits the interior milking claw inlet sealing surface 78 to seal off the constant vacuum from reaching the open-ended teat cup liner 34 and undesirably drawing air into the central dairy milk line.

The controlled flexible portion 74 is disposed adjacent to and downstream from the reinforced portion 76 to enhance and control the direction and degree of bending to optimize contact between the interior milking claw inlet sealing surface 78 and the milking claw inlet 46. The controlled flexible portion 74 preferably includes at least a portion of an annular groove 90 (FIG. 5) extending at least part way around the wall of the short milk tube 38, and more preferably includes a plurality of annular grooves 90 disposed in the upstream direction from the milking claw contact prongs 84. Also preferably, the annular grooves 90 each include a number of ribs 92 to further control the degree and direction of bending. The ribs 92 are illustrated extending on a longitudinal direction relative to the short milk tube 38, but other orientations can be used as well. The controlled flexible portion 74 can include other wall thickness, groove, rib, and other shapes to control the degree and direction of bending.

The reinforced portion 76 is illustrated as an area of increased wall thickness and it is preferred that the wall thickness taper in both the upstream direction and the downstream direction, although other shapes can be used and the thickened portion can be replaced or enhanced with other materials or shapes.

The interior milking claw inlet sealing surface 78 can be part of the inner wall surface 66 or a separate part or a different material joined to the inner wall surface 66. It is also possible that one of the teat cups will drop off from one of the teats before the other teat cups. With a constant vacuum still being applied, the liner 34 will be sealed off by the weight of the teat cup hanging down and kinking the short milk tube 38, so that the amount of air drawn into through the milker unit 30 is minimized.

With this arrangement of the reinforced portion 76, the sealing surface 78 and the controlled flexible portion 74, the short milk tube 38 of the present invention performs the sealing function efficiently without excessive wear to the inside of the short milk tube 38.

In the illustrated embodiments, the reinforced portion 76, the controlled flexible portion 74, and the sealing surface 78 are symmetrical about the longitudinal axis of the short milk tube 38, but asymmetrical features can also be used to provide controlled bending in only one direction, for example.

The short milk tube 38 can be made of rubber, silicone, or other flexible material to provide the necessary bending and flexibility to move between the milking position (FIG. 2) and the resting/non-milking position (FIG. 3). The flexibility at the controlled flexible portion 74 provides these benefits, but to operate properly, it must be positioned accurately on the milking claw inlet 46. For example, if the short milk tube 38 is not pushed far enough onto the inlet 46, the reinforced portion 76 will be above and spaced apart from the inlet 46 and serve no purpose. On the other hand, if the short milk tube 38 is pushed too far onto the inlet 46, the reinforced portion 76 will also miss the inlet 46 end, and the controlled flexible portion 74 will be too close to the milking claw 42 and be constrained by the milking claw inlet 46.

The present invention, therefore, further includes the short milk tube position and release device 72 that provides a visual indication when the short milk tube 38 has been pushed onto the milking claw inlet 46 to the proper extent so that the reinforced portion 76, the interior milking claw inlet sealing surface 78, and the controlled flexible portion 74 are properly positioned relative to the inlet 46. Further, when any or all of the controlled flexible portion 74, the reinforced portion 76, or the sealing surface 78 are asymmetrical as described above, the rotational orientation of the short milk tube 38 would be important, and the position and release device 72 can be used to ensure proper rotational orientation relative to the asymmetrical features.

The position and release device 72 preferably includes at least one milking claw contact prong 84, and more preferably includes a number of spaced apart milking claw contact prongs 84 extending away from the end of the short milk tube 38 to touch a top face 85 of the milking claw 42 and provide a readily visible indication that the short milk tube 38 has been positioned onto the milking claw inlet 46 when they contact a top surface 85 of the milking claw 42 that is adjacent to the milking claw inlet 46. The milking claw contact prongs 84 also provide physical resistance to ensure that the short milk tube 38 has not been pushed too far down the inlet 46. Nonetheless, the milking claw contact prongs 84 are still capable of being compressed for removing the short milk tube 38, as discussed below.

The milking claw contact prongs 84 are depicted as being uniformly sized and spaced, but different quantities, materials, sizes, spacings, and even colors are also possible, especially when they are used to ensure proper rotational orientation, as described above. It is also possible to include one or more alignment markings on the milking claw top face 85 or other appropriate location for alignment with a contact prong 84 to achieve a predetermined rotational alignment of the short milk tube 38. When multiple milking claw contact prongs 84 are included, it may not be necessary that all of them touch the top face of the milking claw 42 to indicate proper positioning of the short milk tube 38.

Further, the milking claw contact prongs 84 assist in removing the short milk tube 38 when they must be replaced due to normal wear and tear or other damage. Assistance is useful because the short milk tube 38 has an inlet contact portion 87 (upstream from the position and release device 72 and at least partially downstream from the controlled flexible portion 74) that oftentimes develops a tenacious adherence to the milking claw inlet 46 during normal use. Simply tugging on the short milk tube 38 to separate the two can require considerable force and is actually counterproductive because the adherence to the milking claw inlet 46 causes the short milk tube 38 material to draw down and stretch, which applies an additional normal force on the interface between the inlet contact portion 87 of the short milk tube 38 and the milking claw inlet 46. As a result, some dairy operators only install the short milk tube 38 part way onto the milking claw inlet 46 to make removing short milk tubes somewhat easier. Such a partial installation of the present invention results in the above-described elements being improperly aligned on the milking claw inlet 46, and thus, the benefits of the present invention will not be fully realized.

Figure 9:
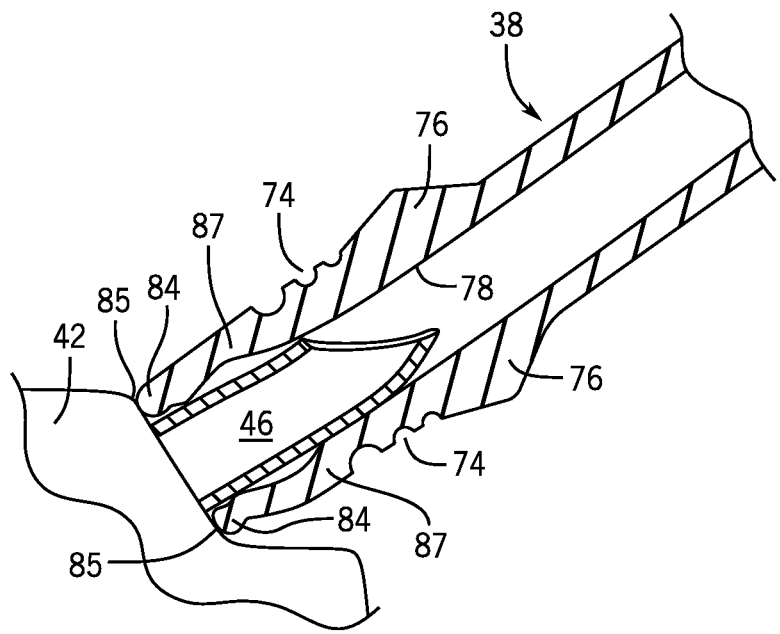
FIG. 9 is a partial perspective view of the short milk tube connected to a milk unit claw with the position and release device prongs compressed during removal, in accordance with the present invention.
Figure 10:
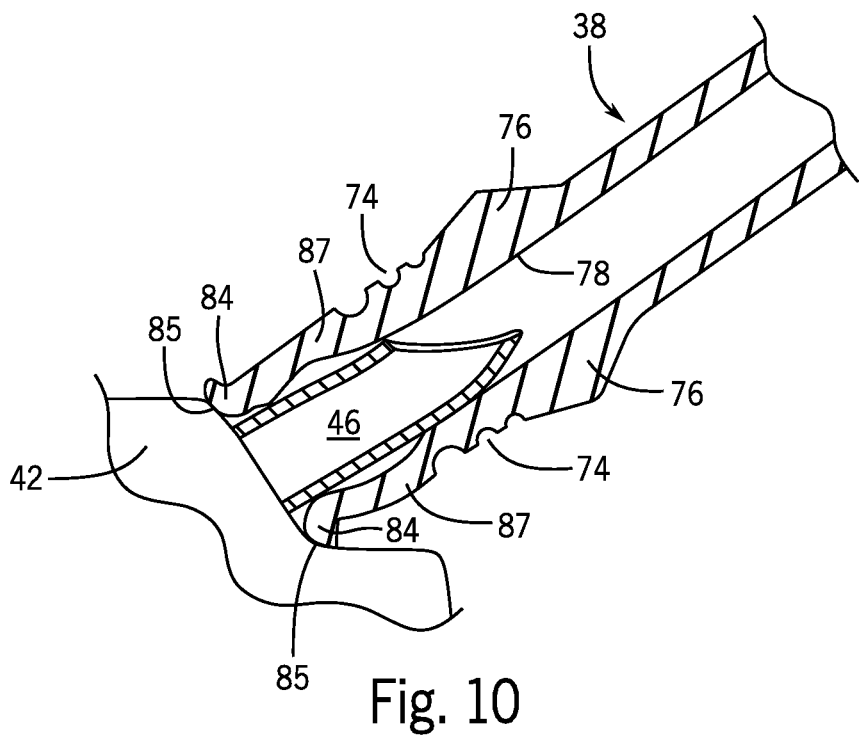
FIG. 10 is a partial perspective view of the short milk tube connected to a milk unit claw with the position and release device prongs flared during removal, in accordance with the present invention.

To break the adherence and release the short milk tube 38 of the present invention, the operator actually pushes the short milk tube 38 toward the milking claw 42 to compress (FIG. 9) or flare (FIG. 10) (or both compress and flare) the milking claw contact prongs 84 against the milking claw 42 top face 85. The compressed or flared milking claw contact prongs 84 are a visual indication that the short milk tube 38 can then be more easily pulled from the milking claw inlet 46 because the adherence of the inlet contact portion 87 to the milking claw inlet 46 has been at least partially overcome. The adherence is at least partially overcome because the compressed (FIG. 9) or flared (FIG. 10) milking claw prongs 84 also bend or compress the adjacent inlet contact portion 87 of the short milk tube 38 away from the inlet 46 and thereby at least partially break any adherence between the short milk tube 38 and the milk claw inlet 46 as seen in FIGS. 9 and 10. Thus, the milking claw contact prongs 84 serve to properly position the short milk tube 38 when being installed and to aid in releasing the short milk tube 38 when replacement is required.

The milking claw contact prongs 84 can be any desired shape or material, but it is preferred to shape them as integrally formed truncated pyramids that are substantially rectangular in cross-section as seen if FIG. 5, for example, so that they provide progressively more resistance as they are pushed against the milking claw 42. Other shapes such as cones, truncated cones, pyramids, cubes, cylinders, and so on, can be used as well. Using such shapes to touch the milk claw top face 85 provides a tactile as well as visual indicator of proper installation of the short milk tube 38.

Installing the short milk tube using the position and release device 72 includes the steps of pushing the short milk tube 38 onto the milking claw inlet 46 until the position and release device 72 contacts the upper surface 85 of the milking claw 42 to ensure that the controlled flexible portion 74, reinforced portion 76, and the sealing surface 78 are located accurately relative to the end of the milking claw inlet 46. Inaccurately positioning the short milk tube 38 on the milking claw inlet 46 could cause the controlled flexible portion 74, the reinforced portion 76, and the sealing surface 78 not to align with the end of the inlet 46. Easier removal of the short milk tube 38 is achieved by a method of first pushing the short milk tube 38 further onto the inlet 46, and compressing the position and release device 72 (contact prongs 84 in the illustrated embodiment) and compressing and bending the adjacent inlet contact portion 87 outwardly from the inlet 46 to thereby at least partially break the bond that may have formed between the inlet contact portion 87 and inlet 46. This then allows significantly less friction when the step of putting the short milk tube 38 under tension (pulling) for removal. is performed. Therefore, protruding positioning prongs 84 act as spacers to guide installation to the optimum extent on the inlet 46 during installation, yet can be easily compressed during the removal procedure to indicate that the bond at the mating interface has been broken before the short milk tube 38 is pulled off.

The above detailed description of the present invention is intended for clearness of understanding the invention, and no unnecessary limitations therefrom should be read into the following claims.

The invention claimed is:
1. A milker unit short milk tube comprising:
an outer wall surface;
an inner wall surface defining a milk passage having an upstream direction and a downstream direction;
a downstream milk claw connection end; and
a position and release device joined to and extending away from the downstream milk claw connection end, and the position and release device defines an interior milking claw inlet sealing surface disposed to releasably receive a portion of a milker unit claw, and the position and release device is compressible in the downstream direction to at least partially disengage the interior milking claw inlet sealing surface from the milker unit claw,
wherein the position and release device comprises a plurality of spaced apart milking claw contact prongs extending in the downstream direction, each of the plurality of contact prongs having a length extending in the downstream direction and being compressible such that the length becomes shorter under compression against the milker unit claw.

2. The milker unit short milk tube of claim 1, wherein the position and release device is compressible in the downstream direction to outwardly bend the interior milking claw inlet sealing surface.

3. The milker unit short milk tube of claim 1, wherein the plurality of milking claw contact prongs are compressible in the downstream direction to bend the interior milking claw inlet sealing surface during a removal procedure.

4. The milker unit short milk tube of claim 1, wherein the position and release device includes the plurality of milking claw contact prongs as a radial orientation indicator.

5. The milker unit short milk tube of claim 1, and further comprising:
a controlled flexible portion disposed in the upstream direction from the position and release device.

6. The milker unit short milk tube of claim 1, and further comprising:
a reinforced portion disposed in the upstream direction from the position and release device.

7. The milker unit short milk tube of claim 1, and wherein the interior milking claw inlet sealing surface is flexible in an outward direction when the position and release device is compressed in the downward direction.

8. The milker unit short milk tube of claim 1, and further comprising:
a reinforced portion disposed on the outer wall surface; and wherein
the interior milking claw inlet sealing surface is disposed substantially opposite the reinforced portion.

9. The milker unit short milk tube of claim 1, and further comprising:
a controlled flexible portion having:
a plurality of annular grooves.

10. The milker unit short milk tube of claim 1, and further comprising:
a controlled flexible portion having:
a plurality of annular grooves; and
a plurality of ribs disposed in the annular grooves.

11. The milker unit short milk tube of claim 1, and further comprising:
a controlled flexible portion having:
at least a portion of an annular groove; and
a plurality of ribs disposed in the groove.

12. The milker unit short milk tube of claim 1, and further comprising:
a controlled flexible portion having:
a plurality of annular grooves; and
a plurality of ribs disposed in a longitudinal direction in each of the grooves.

13. The milker unit short milk tube of claim 1, and further comprising:
a controlled flexible portion disposed in the upstream direction from the position and release device; and
a reinforced portion having an area of increased short milk tube wall thickness.

14. The milker unit short milk tube of claim 1, and further comprising:
an upstream end; and
a milker unit teat cup liner joined to the upstream end.

15. A milker unit short milk tube comprising:
an outer wall surface;
an inner wall surface defining a milk passage having an upstream direction and a downstream direction;
a downstream milk claw connection end;
a position and release device joined to and extending away from the downstream milk claw connection end;
a controlled flexible portion disposed in the upstream direction from the position and release device;
a reinforced portion disposed in the upstream direction from the controlled flexible portion; and
an interior milking claw inlet sealing surface disposed to receive a portion of the milker unit claw, and
the position and release device is compressible in the downstream direction to at least partially disengage the interior milking claw inlet sealing surface from the milker unit claw,
wherein the position and release device comprises a plurality of spaced apart milking claw contact prongs extending in the downstream direction, each of the plurality of contact prongs having a length extending in the downstream direction and being compressible such that the length becomes shorter under compression against the milker unit claw.

16. The milker unit short milk tube of claim 15, wherein the position and release device is compressible in the downstream direction to outwardly bend the interior milking claw inlet sealing surface.

17. The milker unit short milk tube of claim 15, wherein the plurality of milking claw contact prongs are compressible in the downstream direction to outwardly bend the interior milking claw inlet sealing surface during a removal procedure.

18. The milker unit short milk tube of claim 15, wherein the position and release device includes the plurality of milking claw contact prongs as a radial orientation indicator.

19. The milker unit short milk tube of claim 15, wherein the controlled flexible portion comprises:
   a plurality of annular grooves.

20. The milker unit short milk tube of claim 15, wherein the controlled flexible portion comprises:
   a plurality of annular grooves; and
   a plurality of ribs disposed in the grooves.

21. The milker unit short milk tube of claim 15, wherein the controlled flexible portion comprises:
   at least a portion of an annular groove; and
   a plurality of ribs disposed in the groove.

22. The milker unit short milk tube of claim 15, wherein the controlled flexible portion comprises:
   a plurality of annular grooves; and
   a plurality of ribs disposed in a longitudinal direction in each of the grooves.

23. The milker unit short milk tube of claim 15, wherein the reinforced portion comprises:
   an area of increased short milk tube wall thickness.

24. The milker unit short milk tube of claim 15, and further comprising:
   an upstream end; and
   a milker unit teat cup liner joined to the upstream end.

25. A milker unit teat cup liner comprising:
   a liner portion; and
   a short milk tube portion joined to the liner portion, wherein the short milk tube portion includes:
      an outer wall surface and an inner wall surface defining a milk passage having an upstream direction and a downstream direction;
      a downstream milk claw connection end; and
      a position and release device joined to and extending away from the downstream milk claw connection end, and the position and release device defines an interior milking claw inlet sealing surface disposed to releasably receive a portion of a milker unit claw, and the position and release device is compressible in the downstream direction to at least partially disengage the interior milking claw inlet sealing surface from the milker unit claw,
         wherein the position and release device comprises a plurality of spaced apart milking claw contact prongs extending in the downstream direction, each of the plurality of contact prongs having a length extending in the downstream direction and being compressible such that the length becomes shorter under compression against the milker unit claw.

26. The milker unit teat cup liner of claim 25, wherein the position and release device is compressible in a the downstream direction to outwardly bend the interior milking claw inlet sealing surface.

27. The milker unit teat cup liner of claim 25, wherein the plurality of milking claw contact prongs that are compressible in the downstream direction to bend the interior milking claw inlet sealing surface during a removal procedure.

28. The milker unit teat cup liner of claim 25, wherein the position and release device includes a plurality of milking claw contact prongs as a radial orientation indicator.

29. The milker unit teat cup liner of claim 25, and further comprising:
   a controlled flexible portion disposed in the upstream direction from the position and release device.

30. The milker unit teat cup liner of claim 25, and further comprising:
   a reinforced portion disposed in the upstream direction from a controlled flexible portion.

31. The milker unit teat cup liner of claim 25, and wherein:
   the interior milking claw inlet sealing surface is flexible in an outward direction when the position and release device is compressed in the downward direction.

32. The milker unit teat cup liner of claim 25, wherein a reinforced portion is disposed on the outer wall surface opposite the interior milking claw inlet sealing surface.

33. The milker unit teat cup liner of claim 25, and further comprising:
   a controlled flexible portion having:
      a plurality of annular grooves.

34. The milker unit teat cup liner of claim 25, and further comprising:
   a controlled flexible portion having:
      a plurality of annular grooves; and
      a plurality of ribs disposed in the grooves.

35. The milker unit teat cup liner of claim 25, and further comprising:
   a controlled flexible portion having:
      at least a portion of an annular groove; and
      a plurality of ribs disposed in the groove.

36. The milker unit teat cup liner of claim 25, and further comprising:
   a controlled flexible portion having:
      a plurality of annular grooves; and
      a plurality of ribs disposed in a longitudinal direction in each of the annular grooves.

37. The milker unit teat cup liner of claim 25, wherein a reinforced portion comprises:
   an area of increased short milk tube wall thickness.

38. The milker unit short milk tube of claim 1, wherein the contact prongs are integrally formed as truncated pyramids that are substantially rectangular in cross-section.

* * * * *